US008821152B2

(12) United States Patent
Keinath

(10) Patent No.: US 8,821,152 B2
(45) Date of Patent: Sep. 2, 2014

(54) INJECTION-MOLDING MACHINE HAVING AT LEAST TWO TOGGLE LEVER MECHANISMS

(75) Inventor: Renate Keinath, Balingen (DE)

(73) Assignee: Arburg GmbH + Co. KG (DE)

( * ) Notice: Subject to any disclaimer, the term of this patent is extended or adjusted under 35 U.S.C. 154(b) by 0 days.

(21) Appl. No.: 13/880,129

(22) PCT Filed: Oct. 16, 2011

(86) PCT No.: PCT/EP2011/005190
§ 371 (c)(1),
(2), (4) Date: Apr. 18, 2013

(87) PCT Pub. No.: WO2012/052138
PCT Pub. Date: Apr. 26, 2012

(65) Prior Publication Data
US 2013/0224329 A1    Aug. 29, 2013

(30) Foreign Application Priority Data
Oct. 18, 2010    (DE) .......................... 10 2010 048 560

(51) Int. Cl.
*B29C 45/00*    (2006.01)

(52) U.S. Cl.
USPC ............ 425/593; 425/592; 425/542; 425/589

(58) Field of Classification Search
CPC .......................... B29C 45/661; B29C 45/681
USPC .................................. 425/592, 593, 542, 589
See application file for complete search history.

(56) References Cited

U.S. PATENT DOCUMENTS 6,537,057 B2 *   3/2003   Tamaki et al. ................ 425/590
2002/0068109 A1   6/2002   Wang

FOREIGN PATENT DOCUMENTS

| DE | 20120612 U1 | 4/2002 |
| DE | 19923849 C2 | 4/2003 |
| DE | 102006054072 A1 | 5/2008 |
| DE | 102006061969 A1 | 6/2008 |
| EP | 0383935 A1 | 8/1990 |

(Continued)

OTHER PUBLICATIONS

International Search Report for corresponding application PCT/EP2011/005190 filed Oct. 16, 2011; Mail date Jan. 9, 2012.

(Continued)

*Primary Examiner* — Timothy Kennedy
*Assistant Examiner* — David N Brown, II
(74) *Attorney, Agent, or Firm* — Cantor Colburn LLP

(57) ABSTRACT

An injection-molding machine for processing plastics has, on a mold-closing unit (F), at least one injection mold (10) which can be accommodated between a stationary mold carrier (12) and a movable mold carrier (11). The mold carriers are moved by means of at least one pair of toggle levers with two toggle lever mechanisms (K), which are driven in a closing direction (s-s) independently of one another each by a drive unit (A), wherein the toggle lever mechanisms (K) are mounted on a bearing plate (14). Since the bearing plate (14) is mounted on the injection-molding machine such that it can move along guides (28), and the drive units (A) are mounted on the movable bearing plate (14) on which the actuating elements for the at least two toggle lever mechanisms (K) are mounted, it is possible to influence the parallelism of the mold carriers both in the static and in the dynamic state.

9 Claims, 8 Drawing Sheets

(56) References Cited

FOREIGN PATENT DOCUMENTS

| FR | 1364693 | 5/1963 |
|----|---------|--------|
| JP | 62087813 A | 4/1987 |
| WO | 0138069 A1 | 3/2001 |

OTHER PUBLICATIONS

International Preliminary Report on Patentability for corresponding application PCT/EP2011/005190 filed Oct. 16, 2011; Mail date Sep. 20, 2012.

\* cited by examiner

INJECTION-MOLDING MACHINE HAVING AT LEAST TWO TOGGLE LEVER MECHANISMS

CROSS REFERENCE TO RELATED APPLICATIONS

The present application claims priority from German patent application 10 2010 048 560.8, filed on 18 Oct. 2010, the disclosure content of which is hereby also explicitly included as subject matter of the present application.

FIELD OF THE INVENTION

The invention relates to an injection molding machine for processing plastics and other plastifiable materials, having at least two toggle mechanisms.

BACKGROUND OF THE INVENTION

EP 0 383 935 A1, which forms the basis of the preamble of claim 1, discloses an injection molding machine with a mold closing unit, on which two toggle mechanisms for adjusting mold parallelism are driven in servo-controlled manner by means of two drive units in the form of servo motors. The servo motors drive spindles, which are connected to a nut which is mounted such that it actuates the toggle mechanism. The drive motors and a mold height adjusting mechanism are attached to the rear support plate, such that the masses moved are reduced.

DE 199 23 849 C2 discloses a mold closing unit for an injection molding machine, on which a double toggle mechanism is driven by means of a thrust crank. The thrust crank and its drive unit are mounted on a rear supporting element.

DE 10 2006 061 969 B4 discloses an injection molding machine with two toggle mechanisms configured as a Y-shaped toggle. In this respect, the drive motors are arranged transversely of the drive axis.

BRIEF SUMMARY OF THE INVENTION

Taking this prior art as basis, the invention develops further an injection molding machine of the above-mentioned type in such a way as to make it possible to influence the parallelism of the mold carriers in both the static and the dynamic state.

The toggle mechanisms are driven in a known manner by separate drive units or mechanisms, but these drive units are now mounted on a bearing plate likewise moved during toggle movement, on which bearing plate the actuating elements for the toggle mechanisms are mounted. As a result of toggle movement, said plate moves at the start of the movement at roughly the same rate as the mobile mold carrier, whilst towards the end of the mold movement said bearing plate continues to move in the millimeter range, while the mold carriers are already in the mold-closing state. The position of the bearing plate may thereby be used as a reference dimension for mold movement, since the transmission ratio on mold closing is most precise there. While in the prior art adjustment by way of the drive motors takes place above all during the mold closing movement, the configuration selected herein allows the resulting greater precision still to be influenced even on mold closing in the event of corresponding adjustment. To increase precision still further, the bearing plate is guided on force transmission elements such as beams arranged between the stationary mold carrier and the supporting element and on the machine foot eventually.

By mounting the drive motors themselves on the bearing plate, the masses to be moved are increased, but this is taken consciously into account, since an extremely rigid plate is formed overall, which may simultaneously be used as a multifunctional part. In addition, this bearing plate may be fully preassembled with its drive units as an independent module and then installed in the machine. For the manufacturer this means on the one hand better prefabrication, it being possible to carry out functional tests on the module even before "marriage" with the rest of the machine. It is additionally possible to dispatch the entire module separately to other countries. Alternatively, a nut or spindle may be mounted on the bearing plate as part of the drive mechanism, such that a grid frame-like bearing plate may be formed, to which the prefabricated drive unit may then be added during production or during subsequent operational maintenance. In both cases, however, the guidance of said bearing plate ensures increased precision.

As a multifunctional element, the bearing plate on the one hand accommodates the drive unit, which comprises the motor, such as for example a servo motor, and also bearings, nuts and spindles, has the bearing points for toggle mounting and also comprises seatings for guiding the plate. In addition to the function of driving the toggles, which are mounted on this bearing plate, guidance of the bearing plate relative to the rest of the machine may lastingly influence the accuracy of the interplay between opening and closing of the injection mold. Cooling devices for bearing, nut and spindle may likewise be provided on said plate. Since this cooling may for example be integrated into the bearing plate, geometric accuracy is obtained for the entire system, which increases the service life of the injection molding machine as well as precision during the production of injection moldings.

BRIEF DESCRIPTION OF THE DRAWINGS

The invention is explained in greater detail below with reference to exemplary embodiments illustrated in the Figures, in which.

DETAILED DESCRIPTION OF PREFERRED EMBODIMENTS

Figure 1:
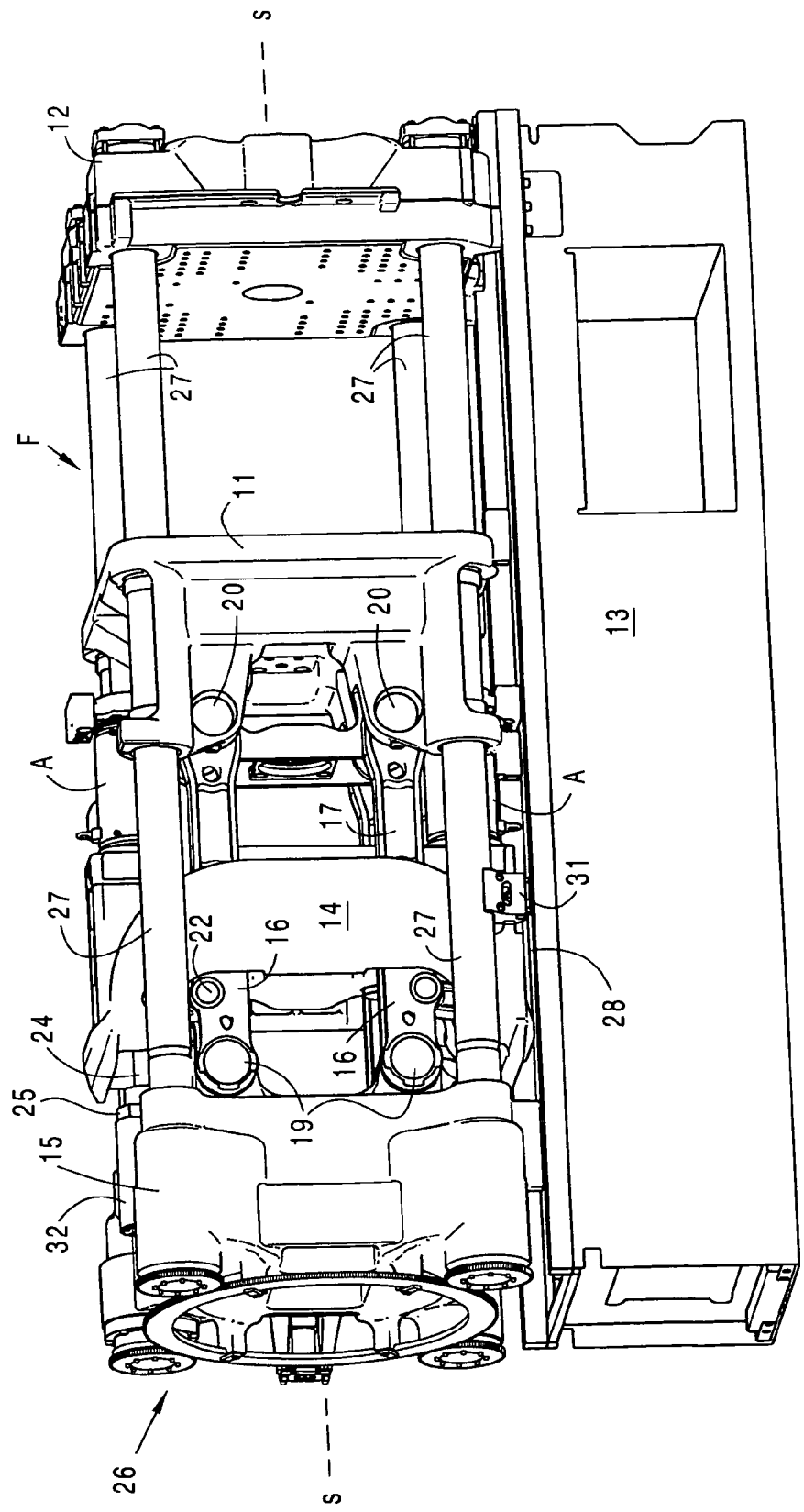
FIG. 1 is a three-dimensional side view of a mold closing unit arranged on a machine foot.

The invention will now be explained in greater detail by way of example with reference to the appended drawings. However, the exemplary embodiments are merely examples, and are not intended to restrict the inventive concept to a specific arrangement. Before the invention is described in detail, it should be pointed out that it is not limited to the particular components of the device and the particular method steps, since these components and methods may vary. The terms used herein are merely intended to describe particular embodiments and are not used in a limiting manner. In addition, where the description or the claims use(s) the singular or indefinite article, this also covers a plurality of said elements, providing that the overall context does not unambiguously indicate otherwise.

The Figures show two exemplary embodiments of an injection molding machine for processing plastics and other plastifiable compositions such as pulverulent, metallic or ceramic compositions, said machine having, as is conventional in an injection molding machine, a mold closing unit F on a machine foot 13 and an injection molding unit not shown in the drawings. Between the mold carriers, namely a stationary mold carrier 12 and a movable mold carrier 11, at least one injection mold 10 comprising a plurality of parts may be accommodated. At least one toggle pair with two toggle mechanisms K, which may be individually driven by separate drive units A, are provided for movement of the mold carriers in the closing direction s-s towards one another up to closing of the injection mold 10 and away from one another to open the injection mold 10. The toggle mechanisms K are mounted on a bearing plate 14, 14'. As is in particular clear from FIGS. 2 to 4 and 6, the drive units are mounted on a bearing plate 14, 14', which is moved in the closing direction during the closing and opening movements. The bearing plate includes bearing points 23, clearly visible in FIG. 4, on which the actuating elements for the at least two toggle mechanisms K are mounted. In principle, a similar configuration may be provided in the case of more than two toggle mechanisms.

Figure 2:
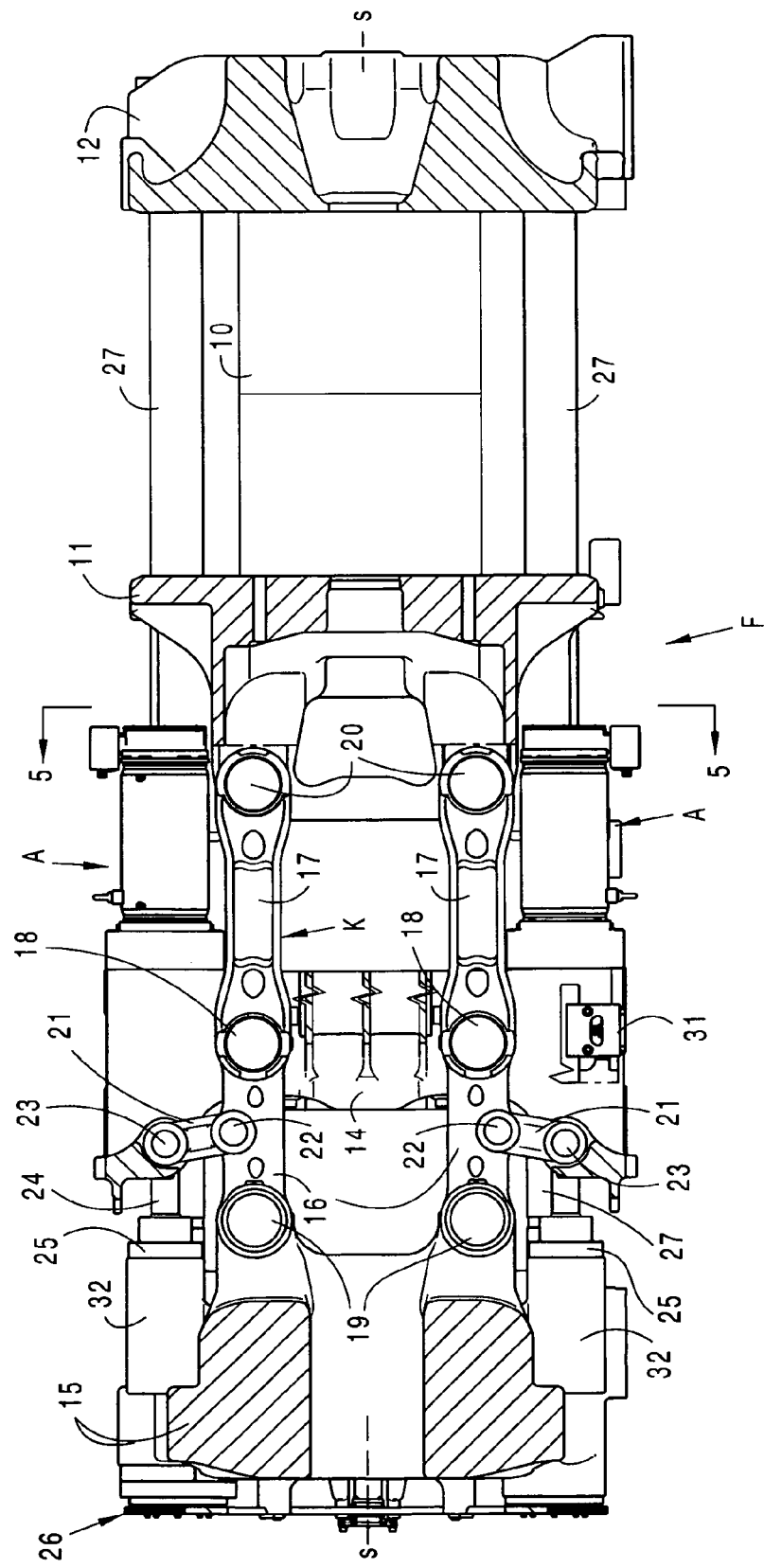
FIG. 2 shows a vertical section through the mold closing unit of FIG. 1 at the level of the center axis with the toggle mechanisms in extended position and a closed injection mold.
Figure 3:
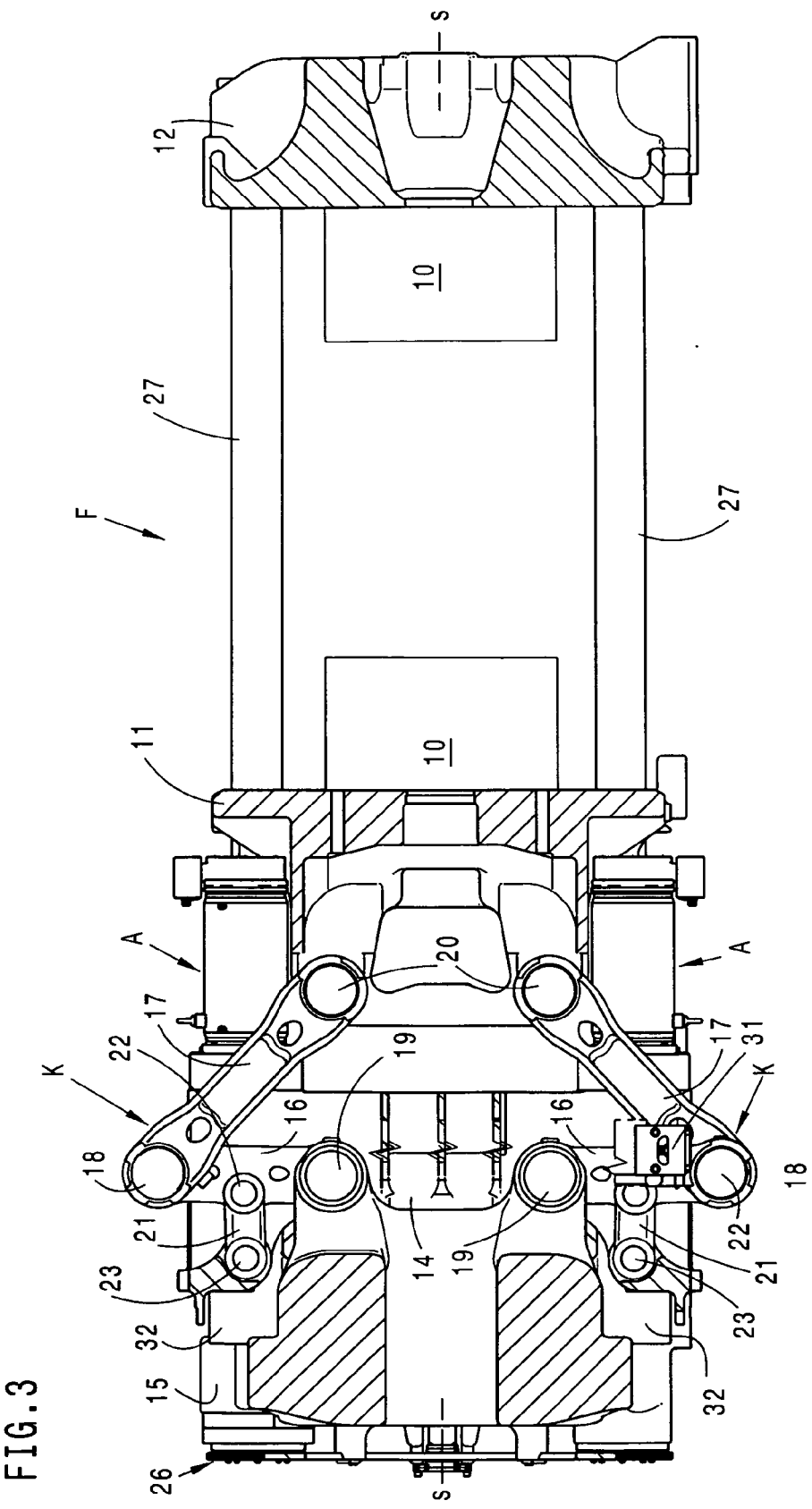
FIG. 3 shows an illustration according to FIG. 2 with an open injection mold.

According to FIG. 2, the toggle mechanism K is mounted in articulated manner at one end on a mold carrier, in the exemplary embodiment on the movable mold carrier 11, and at the other end on a supporting element 15, the bearing plate 14 being arranged between the mold carrier and the supporting element. In principle, a configuration is also conceivable in which the at least two toggle mechanisms are mounted on the stationary mold carrier, as shown for example in DE 10 2006 061 969 B4. In contrast therewith, however, the bearing plate is here located between mold carrier and supporting element.

Figure 4:
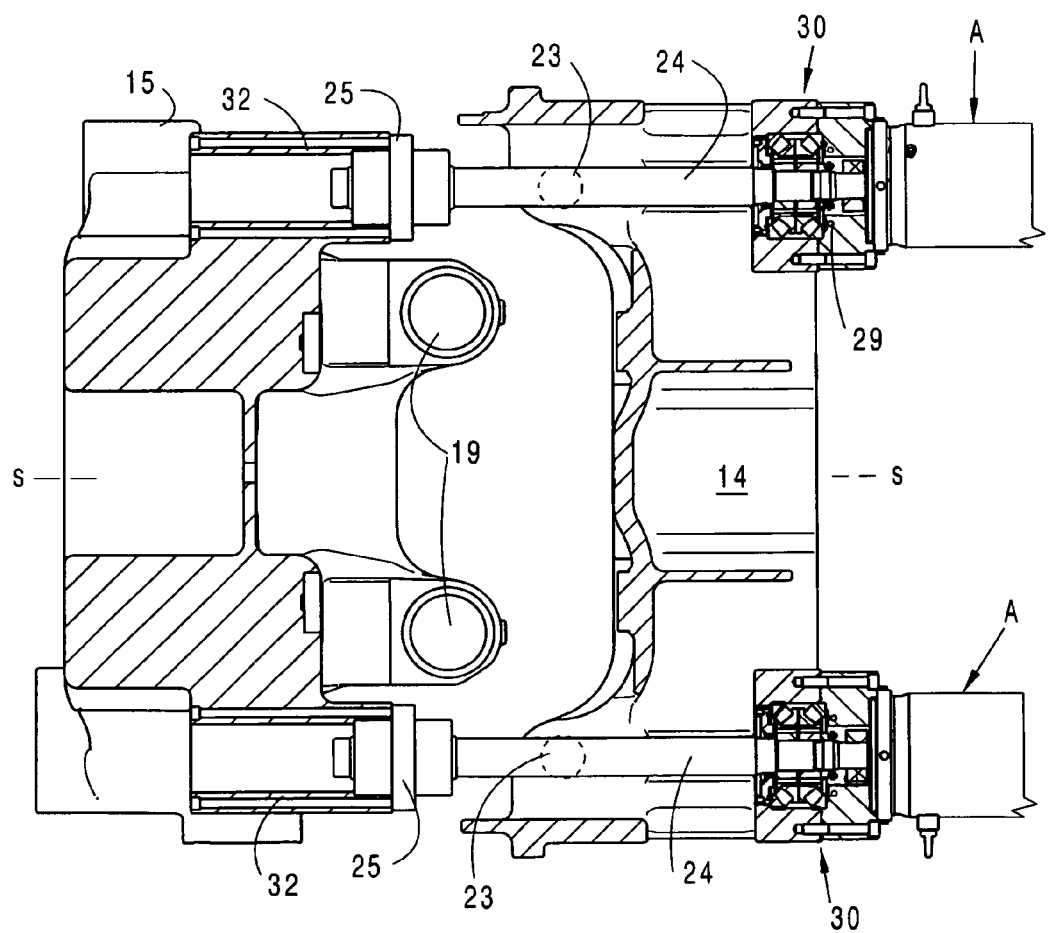
FIG. 4 shows a vertical section through the bearing plate with the drive units mounted thereon.
Figure 5:
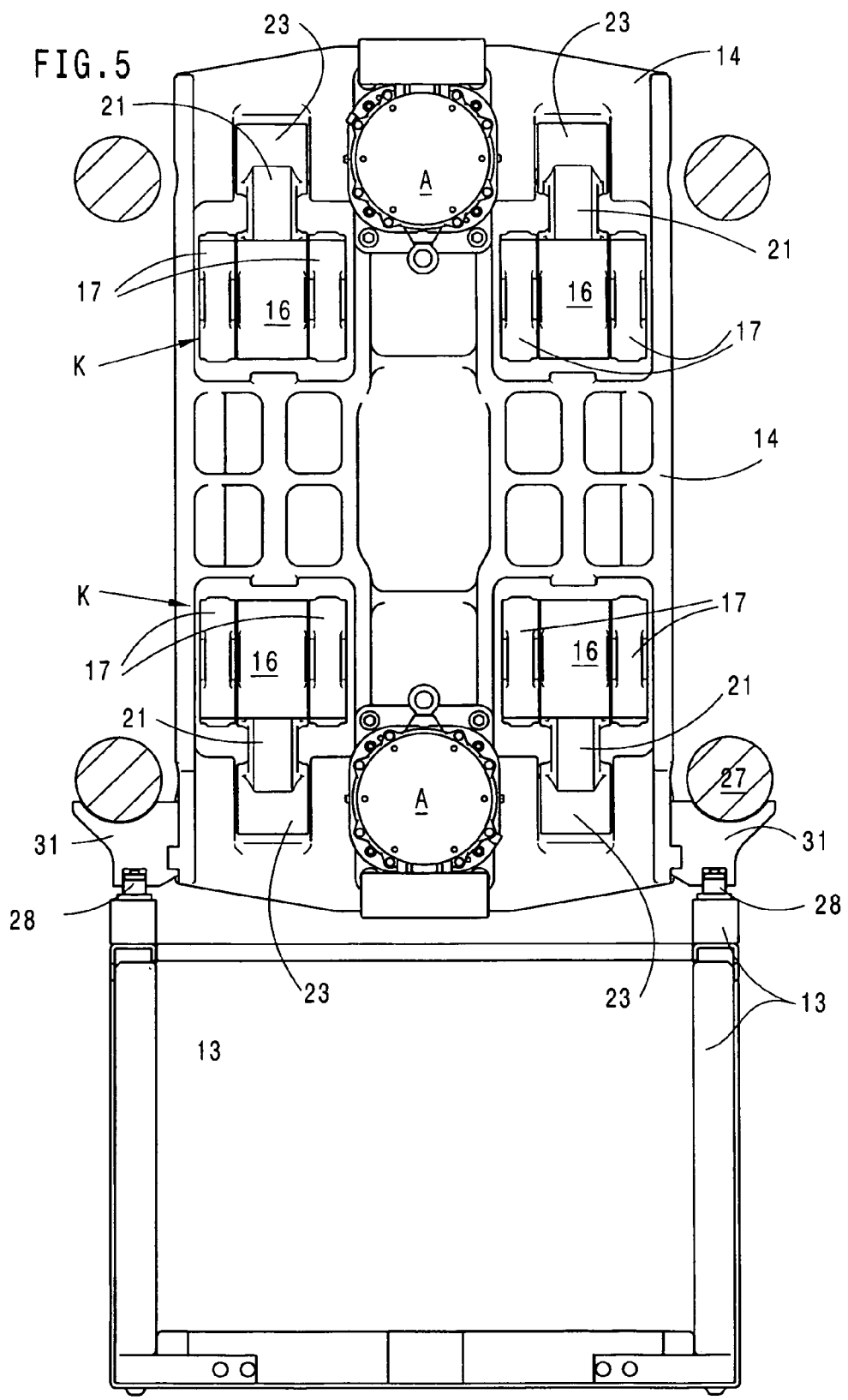
FIG. 5 shows a section along line 5-5 of FIG. 2.

In conjunction with FIG. 2, FIG. 4 shows how the drive units A are mounted. At one end, a bearing 30 is provided for mounting the drive unit A on the bearing plate 14. The drive unit, which in the exemplary embodiment is a servo-electric motor with associated spindle mechanism and comprises lead or roller spindles of any desired design, is provided in the bearing region with cooling by cooling ducts 29 or in FIG. 6 with a cooling jacket 33. As an alternative to the servo-electric drive unit, however, hydraulic drive units may also be used, provided that the drive mechanism is mounted in the same way. The short structure of the closing unit ensured by the arrangement of the toggle mechanisms is also clear.

In the first exemplary embodiment of FIGS. 1 to 5, the drive unit is mounted at one end on the bearing plate 14, while the associated drive mechanism, i.e. the spindle mechanism in the exemplary embodiment, is mounted at the other end on the supporting element 15, on which the toggle mechanism K is also mounted in the exemplary embodiment. This arrangement is reversed in the exemplary embodiment of FIGS. 6 to 8, i.e. in FIG. 6 the drive motor is mounted on the supporting element 15', while the nut 25 is mounted on the bearing plate 14'. Common to both exemplary embodiments is guidance of the bearing plate 14, 14' in the closing direction s-s, in the one case using the machine foot 13 and in the other using the force transmission elements 27, wherein a combination of the two guides or a guide at another location in the injection molding machine in the closing direction s-s is also possible.

FIG. 2 shows the spindle 24 on the one hand and the mount for the nut 25 on the other. Since, as a result of rotation of the spindle 24, the latter moves with the bearing plate 14 to the left in the Figures during the opening movement, i.e. on changeover from the representation according to FIG. 2 to the representation according to FIG. 3, a receiving housing 32, into which the spindle 24 may enter, is provided in the region of the nut 25. The spindle 24 is driven by the drive unit A mounted on the bearing plate, while the nut 25 is mounted non-rotatably on the supporting element 15. This concept may in principle also be reversed, i.e. rotation of the nut and a non-rotatable mounting of the spindle. To this end, known hollow-shaft motors may be used, for example.

The toggle mechanism K is a five-point toggle in both exemplary embodiments. In this respect, an articulated lever 21 is mounted in articulated manner on one of the two toggles 16 of the respective toggle mechanism K and is coupled at the other end to the bearing point 23 on the bearing plate 14, 14'. This bearing point 23 moves in the closing direction s-s during closing and opening movement, as is clear from a comparison of FIGS. 2 and 3. The movement pivots the articulated lever 21, however, leading to changeover of the toggle from the position according to FIG. 3 into the extended position according to FIG. 2. In the extended position, the two toggles 16, 17 are extended substantially in the closing direction s-s and the toggle joint 18 is roughly in a line with the coupling points 19 on the supporting element 15 and the coupling point 20 on the movable mold carrier 11, said line being parallel to the closing direction s-s. In the position according to FIG. 3, the toggles 16, 17 of the toggle mechanisms arranged preferably vertically one above the other have moved outwards from their extended, inner position on the opening movement of the injection mold 10. This movement sequence contributes to the short structure of the mold closing unit overall.

A mold height adjusting mechanism 26 is provided on the supporting element 15, 15' in order to adjust the extended position which is of significance to the toggle mechanisms. The mold height is here understood to be the height of the injection mold 10 when the mold is clamped between the movable mold carrier 11 and the stationary mold carrier 12, i.e. the distance between the mold carriers when the mold is clamped. Depending on this distance, the supporting element 15 needs to be moved in the closing direction s-s by the mold height adjusting mechanism 26, in order to achieve efficient, energy-saving mold clamping with maximum force. The supporting element 15, 15' is itself connected to the stationary mold carrier 12 via force transmission elements. In the exemplary embodiment, the force transmission elements take the form of columns or beams 27, but in principle force transmission elements may also be used which transmit the forces around the mold clamping space, such that the space between the mold carriers is virtually freely accessible. Stirrup-like elements are known in the prior art for this purpose.

The bearing plate 14 is mounted on the machine foot 13 on guides 28, wherein by guiding the plate the accuracy of interplay between opening and closing is influenced. According to FIG. 5, bearings 31 are provided for this purpose, which mount the bearing plate 14 on the guides 28. The bearings 31 may also be configured such that the beams 27 provide guidance. As illustrated in FIG. 4, the bearing plate may be fully preassembled with its drives as an independent module and then installed in the machine. This allows the functionality of said module to be tested prior to connection with the rest of the injection molding machine.

The bearing plate is preferably of one-piece construction and in this respect is a multifunctional part. It serves not only to accommodate the drive unit A with the associated bearings or the spindle 24, it also comprises bearing points 23 for mounting the toggles and has receptacles for the guides 28 of the bearing plate 14 on the machine foot 13. Cooling devices, such as cooling ducts 29 in the plate, or a cooling jacket 33 in the second exemplary embodiment, are preferably also provided for the bearings of the spindle 24 or for direct cooling of the nut 25, so increasing the geometric accuracy and service life of the injection molding machine. The cooling devices are provided in particular at the points at which the drive units A, A' are connected to the bearing plate 14, 14'. By cooling or temperature control, the same temperature is ensured at the two drive units, such that the temperature-dependent longitudinal expansion is likewise equal, which thus further increases the precision of the entire system.

The position of the bearing plate 14, 14' serves as a reference criterion for mold movement, since the transmission ratio, above all on mold closing, is most accurate there. It allows the parallelism of the mold carriers and thus of the parts of the injection mold to be influenced even in the static state. In both the static and dynamic states, i.e. during the mold closing movement, the servo motors may be adjusted, for example by corresponding position encoders, to achieve the desired parallelism. In this case, the distances covered by the bearing plate 14, 14' at the start of the mold closing movement are roughly identical to the movement of the movable mold carrier 11, but close to the point of mold closing the bearing plate 14 continues to move, while the movable mold carrier effects scarcely any further movement.

Figure 6:
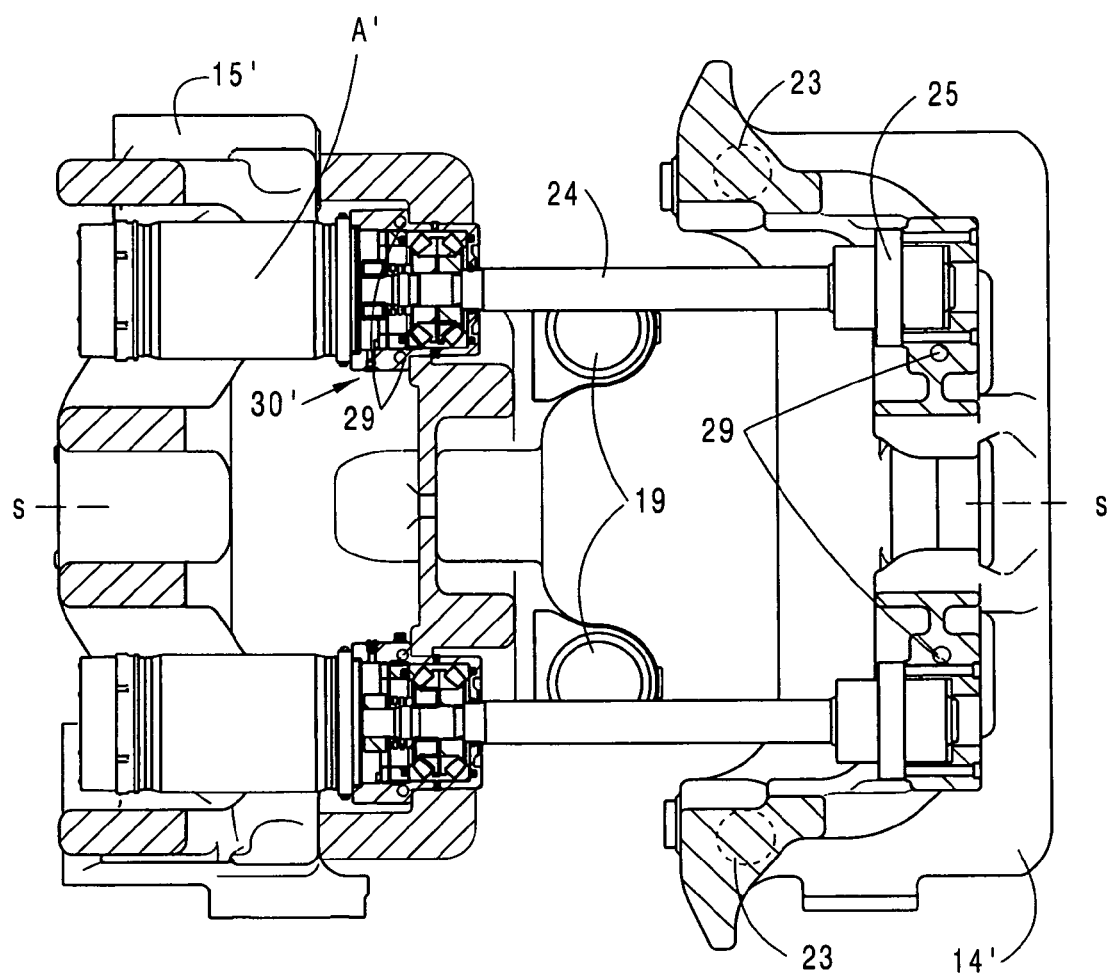
FIG. 6 shows an illustration according to FIG. 4 of a further exemplary embodiment with drive units mounted on the supporting element.
Figure 7:
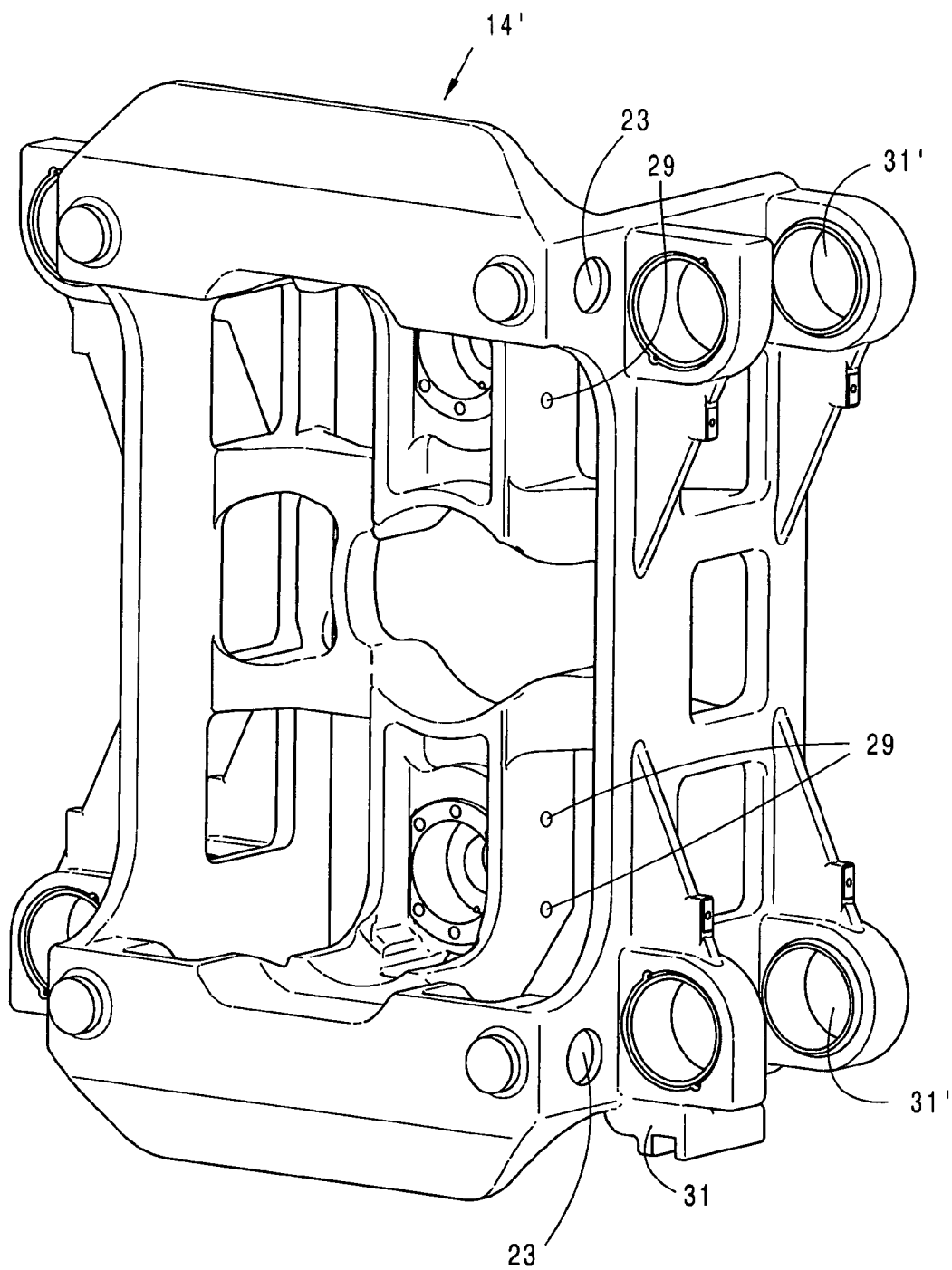
FIG. 7 shows a three-dimensional illustration of the bearing plate according to FIG. 6.
Figure 8:
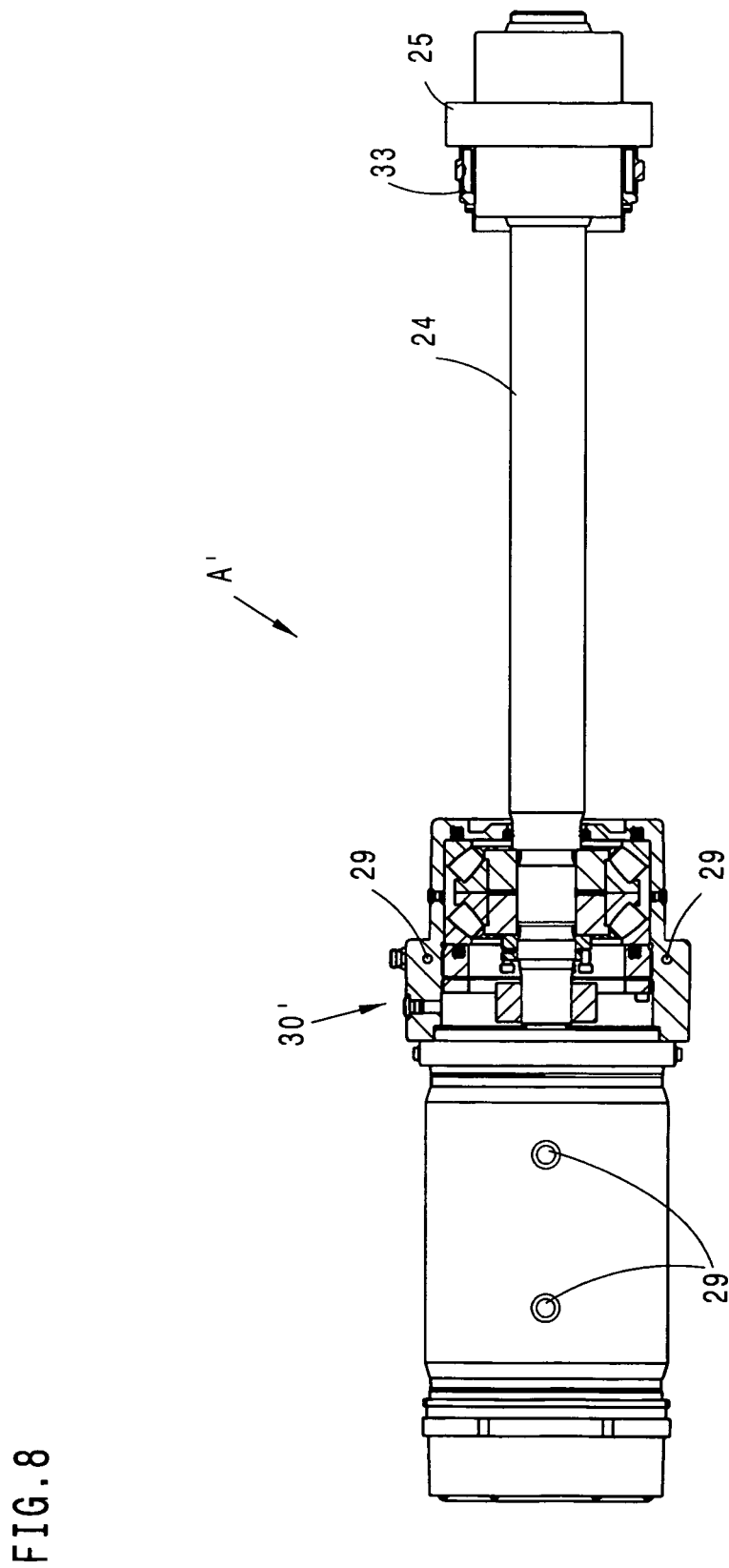
FIG. 8 shows a partially sectional illustration of a drive unit.

In the exemplary embodiment of FIGS. 6 to 8 on the one hand the arrangement of motor and nut 25 is reversed relative to the first exemplary embodiment. In addition, the drive unit A' according to FIG. 8 forms a drive module removable from the bearing plate, said drive module substantially comprising motor, bearing, nut 25 and spindle 24 as well as the cooling jacket as a structural unit. This is advantageous if, for example during servicing, the drive unit needs to be replaced, since the new unit can then be inserted as a complete, pretested unit.

According to FIG. 7, the bearing plate 14' of the second exemplary embodiment is of grid frame-like construction, the toggle mechanisms K being arranged within the force transmission elements, which take the fcenter beams and act as a guide for the bearing plate 14' by way of the bearings 31'. The arrangement of the toggle mechanisms relatively far inwards relative to the center axis, which is thus possible, contributes on the one hand to the fact that the forces arising may be readily dissipated and removed with less deflection of the bearing plate 14'. On the other hand, this simultaneously assists in an open structure of the bearing plate 14' as a frame structure, which at the same time simplifies access to the components of the mold closing unit.

It goes without saying that the present description may be subjected to the most varied modifications, changes and adaptations which are of the nature of equivalents to the appended claims.

The invention claimed is:

1. An injection molding machine for processing plastics and other plastifiable materials, with a mold closing unit arranged on a machine foot, comprising at least one injection mold accommodated between a stationary mold carrier and a movable mold carrier,
at least one toggle pair with two toggle mechanisms, each driven mutually independently by a drive unit,
a plurality of force transmission element for absorbing the forces arising, which force transmitting elements connect the stationary mold carrier with a supporting element,
the toggle mechanisms being mounted on a movable bearing plate, the movable bearing plate being mounted on the injection molding machine so as to be movable on the force transmitting elements,
the plurality of drive units being mounted on the movable bearing plate, on which the actuating elements for the at least two toggle mechanisms are mounted,
wherein the plurality of force transmitting elements are arranged on mutually opposite sides symmetrically to a center axis and serve as a guide for the movable bearing plate, and
wherein all drive units are mounted on the movable bearing plate not directly connected with the force transmitting elements.

2. An injection molding machine according to claim 1, wherein the toggle mechanisms are mounted in an articulated manner at one end on a mold carrier, and at the other end on the supporting element, the movable bearing plate being arranged between the mold carrier and the supporting element.

3. An injection molding machine according to claim 1, wherein a drive mechanism operated by the drive unit mounted at one end on the movable bearing plate is mounted at the other end on the supporting element, on which the toggle mechanisms are also mounted.

4. An injection molding machine according to claim 1, wherein the drive unit is a servo-electric motor, which drives a spindle mechanism, wherein spindle or nut, respectively, are driven by the drive unit mounted on the movable bearing plate, while nut or spindle, respectively, are mounted non-rotatably on the supporting element.

5. An injection molding machine according to claim 1, wherein an articulated lever mounted in articulated manner at one end on one of two toggles of the respective toggle mechanism is mounted at the other end in articulated manner at a bearing point of the bearing plate.

6. An injection molding machine according to claim 1, wherein during an opening movement of the injection mold toggles of the toggle mechanisms arranged vertically one above the other move outwards from an extended, inner position.

7. An injection molding machine according to claim 1, wherein the movable bearing plate is of grid frame-like construction, the toggle mechanisms (K) being arranged within the force transmission elements configured as beams.

8. An injection molding machine according to claim 1, wherein cooling devices for temperature control of the drive units are provided at points at which the drive units are connected to the movable bearing plate.

9. An injection molding machine according to claim 1, wherein the movable bearing plate is movable along guides on the machine foot.

* * * * *